United States Patent [19]

Huvey

[11] Patent Number: 4,777,070
[45] Date of Patent: Oct. 11, 1988

[54] ALVEOLAR STRUCTURE DESIGNED TO COVER A CURVED SURFACE AND ITS REALIZATION PROCESS

[75] Inventor: Michel Huvey, Bougival, France

[73] Assignee: Institut Francais du Petrole, Rueil-Malmaison, France

[21] Appl. No.: 731,403

[22] Filed: May 7, 1985

[30] Foreign Application Priority Data

May 11, 1984 [FR] France ................... 84 07282

[51] Int. Cl.⁴ ................................ B32B 3/12
[52] U.S. Cl. ................... 428/116; 428/36; 428/118
[58] Field of Search ............... 428/116, 118, 36

[56] References Cited

U.S. PATENT DOCUMENTS

| | | | |
|---|---|---|---|
| 2,815,795 | 12/1957 | Vander Poel | 428/116 X |
| 3,013,584 | 12/1961 | Reed et al. | 428/116 X |
| 3,016,315 | 1/1962 | Robinson | 428/116 X |
| 3,033,734 | 5/1962 | Price | 428/116 X |
| 3,100,928 | 8/1963 | Bryand | 428/116 X |
| 3,104,194 | 9/1963 | Zahorski | 428/116 |
| 3,109,766 | 11/1963 | Norris | 428/116 |
| 3,139,375 | 6/1964 | Bryand | 156/197 X |
| 3,212,189 | 10/1965 | Savit | 428/116 X |
| 3,259,961 | 7/1966 | Bryand | 428/116 X |
| 3,589,033 | 6/1971 | Bryand | 34/240 |
| 3,590,453 | 7/1971 | Bryand | 162/357 X |
| 3,946,892 | 3/1976 | Rigal et al. | 428/116 X |
| 4,001,473 | 1/1977 | Cook | 428/116 |
| 4,338,273 | 7/1982 | Schnedecker | 156/244.13 X |
| 4,457,963 | 7/1984 | Ittner et al. | 428/116 X |
| 4,513,041 | 4/1985 | Delluc | 428/69 |

FOREIGN PATENT DOCUMENTS

| | | | |
|---|---|---|---|
| 727074 | 2/1966 | Canada | 428/116 |
| 3210320 | 9/1983 | Fed. Rep. of Germany | 428/116 |
| 961785 | 6/1964 | United Kingdom | 428/116 |

*Primary Examiner*—Henry F. Epstein
*Attorney, Agent, or Firm*—Antonelli, Terry & Wands

[57] ABSTRACT

An alveolar structure for carrying hot or cold liquids which includes alveoles demarcated by several walls. At least one of the alveoles comprises at least one wall having at least two edges substantially parallel to each other and at least one wall comprising at least two edges not parallel to each other, with each of the substantially parallel or non-parallel to each other having an orthogonal projection length greater than zero and a line perpendicular to a surface to be covered by the alveolar structure through the edge in question.

14 Claims, 10 Drawing Sheets

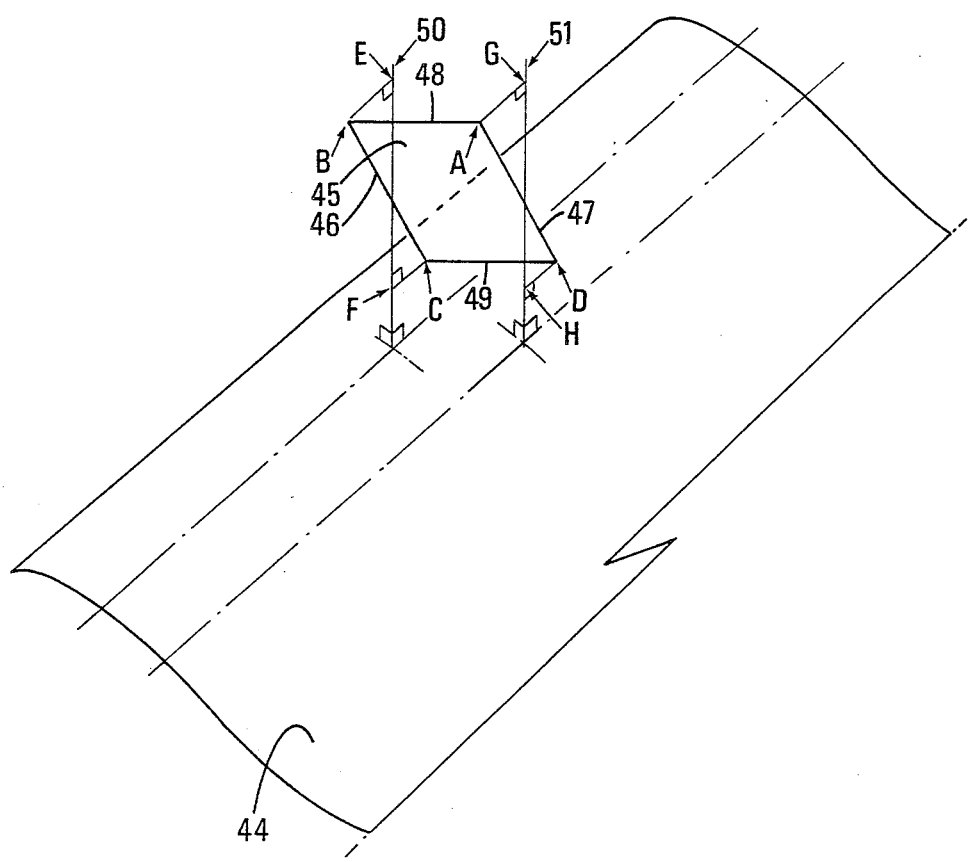

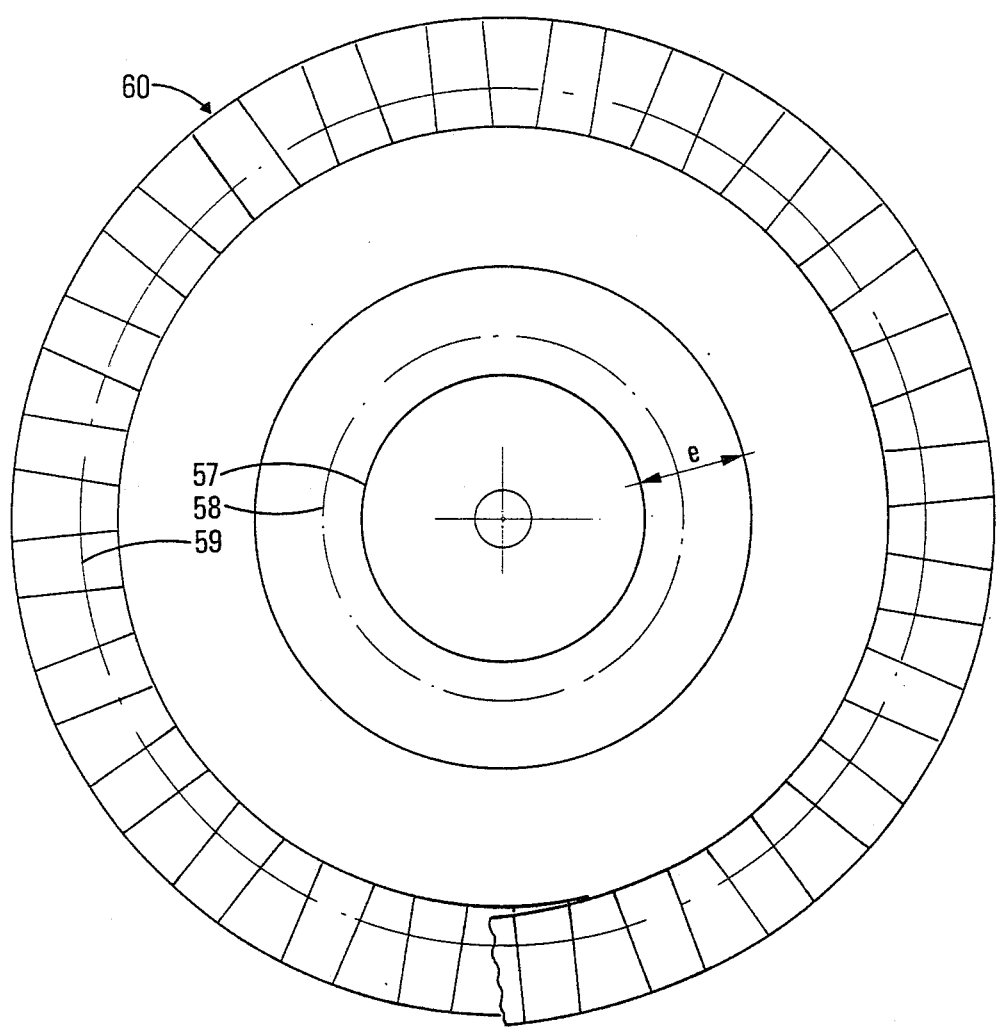

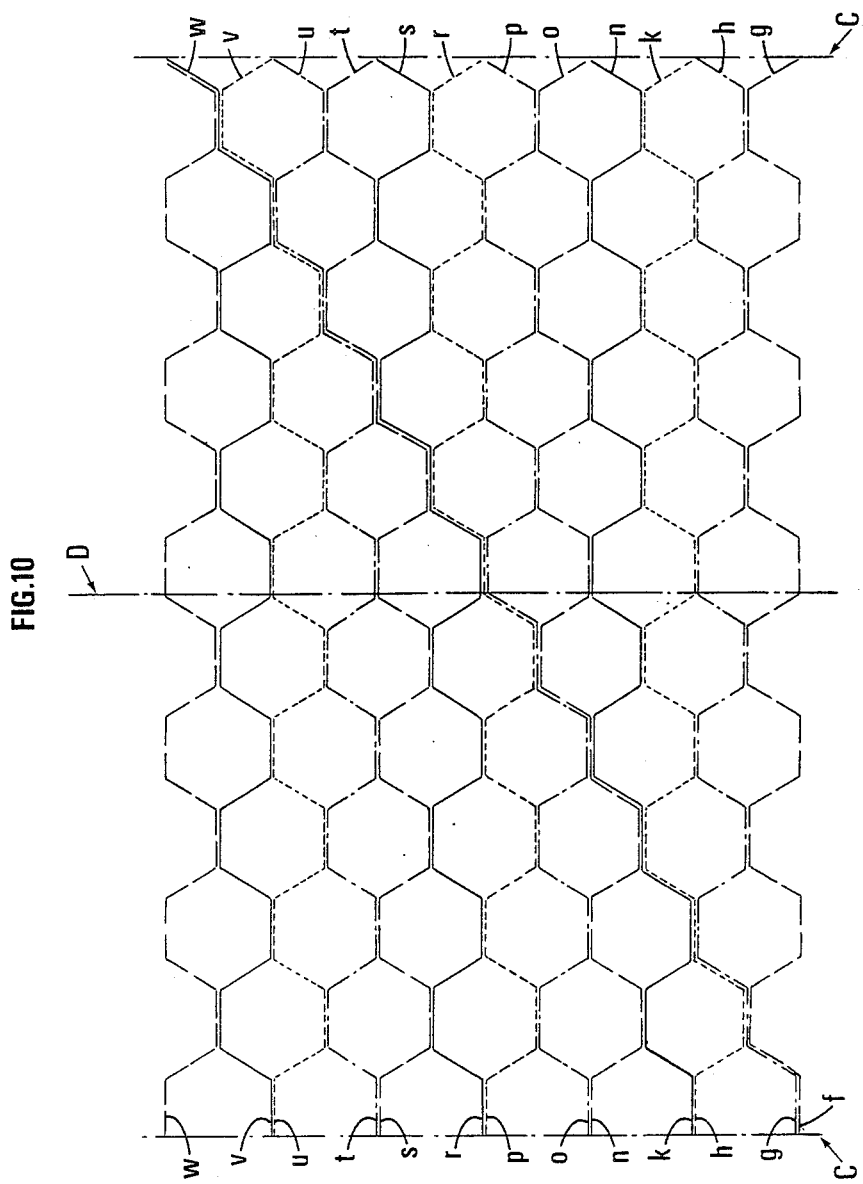

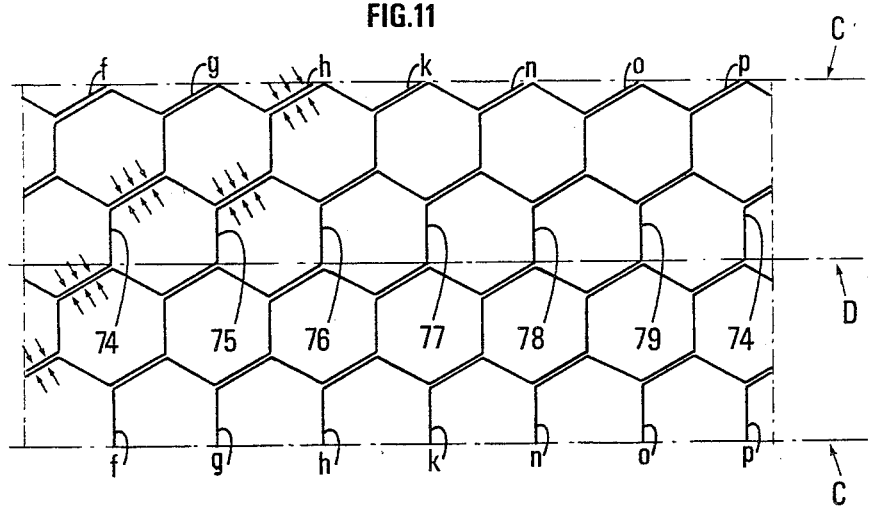
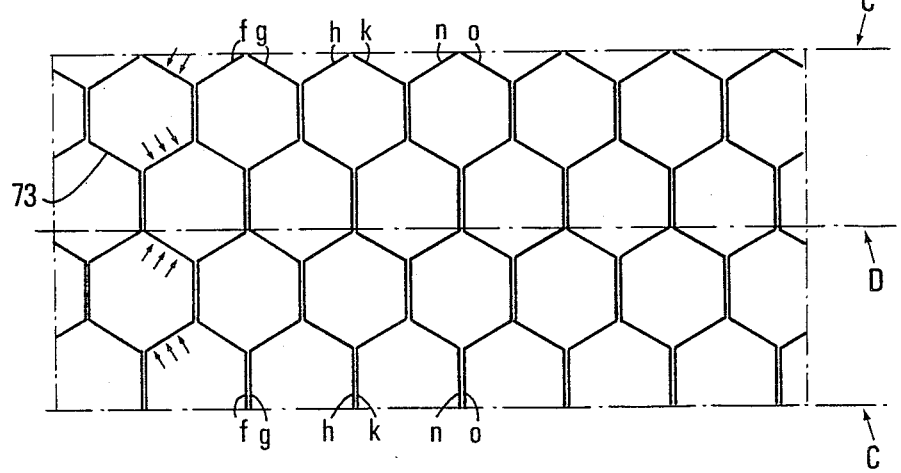
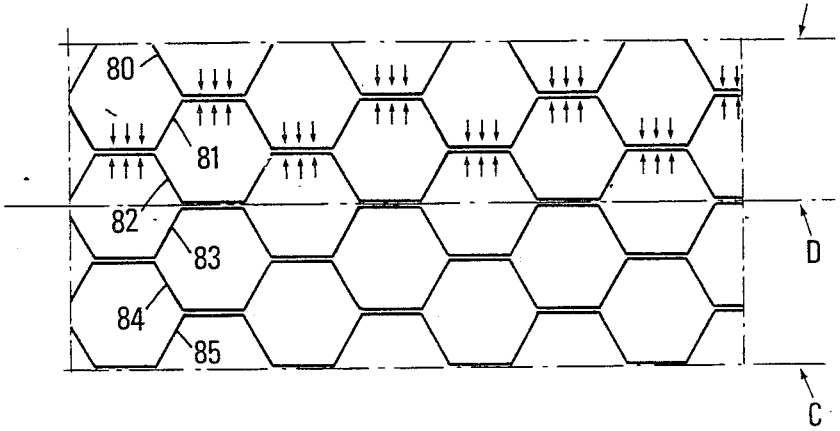

ALVEOLAR STRUCTURE DESIGNED TO COVER A CURVED SURFACE AND ITS REALIZATION PROCESS

BACKGROUND OF THE INVENTION

The present invention concerns an alveolar structure, designed in particular to cover a cylinder or more generally an inwardly skewed surface, together with a process for producing such a structure.

Flat alveolar bodies (usually called honeycombs) are generally produced by stacking rectilinear sheets or strips which are partly glued to each other according to transversal zones having all transversal sides parallel to each other, the final product being obtained by traction, perpendicularly to the plane of sheets or strips, in order to obtain prismatic alveoles with a more or less regular hexagonal shape. The alveoles obtained have walls, the sides of which, determined by the assembly lines, are all parallel to each other.

Flat alveolar bodies can only be placed on a cylinder if the ratio of a thickness thereof to a diameter of the cylinder is very low. As soon as this ratio increases, significant stresses appear in the walls of the alveoles which may either buckle in a compression zone or split in a traction zone.

Similar products, presenting greater rigidity in a privileged direction, are realized from the assembling of preformed strips as they are not expansible. Such alveolar products are flat and, without undergoing deformations harmful to their mechanical properties, may only cover roughly flat surfaces.

Alveolar products are described in, for example, U.S. Pat. Nos. 2,815,795, 3,100,928; 3,139,375 and 3,259,961; in the French Pat. Nos. 2.131.029 and 2.131.068; and in the German patent application No. 3.210.320.

Manufactured flat, as can be clearly seen from FIG. 5 of the French Pat. No. 2.131.029, these products have the characteristic, which only enables them to be used on tubes, of not being assembled over their whole flat assembly surface, but only by a fillet weld or soldering or by a scalloper riveting which may possibly result in deformation of the initial assembly surfaces, thereby possibly reducing the traction part and increasing in compression with the result that stresses could result in a rupture at the time of mounting on the cylinder.

It is obvious that limitation of the assembly surface to one line results in stress concentrations in service, independent of the fact that such a structure, if realized using several sheets situated opposite each other but not perfectly joined, would very probably be subject to corrosion.

The process according to the invention avoids these drawbacks and enables structures of strong thickness to be realized which can be placed naturally with very low external forces and stresses limiting those of expansion, where the body is manufactured in a compressed state, on cylindrical walls whose local bending radius may be slight.

The alveolar structure according to the present invention is specifically designed to cover at least part of a cylindrical surface. This structure, which comprises alveoles demarcated by several walls, is characterized in that at least one alveole comprises at least one wall having at least two edges roughly parallel to each other and at leat one wall comprising at least two edges not parallel to each other, with each of these edges roughly parallel and not parallel to each other having an orthogonal length projection different from zero on a line perpendicular to the said cylindrical surface passing through the edge in question.

The alveolar structure according to the invention is obtained using curved strips, i.e. the strip or strips comprise at least one non-rectilinear part.

A structure comprising several alveoles according to the invention may be obtained using at least one curved strip comprising several zones disposed transversally with respect to the curved strip, with some of the zones corresponding to walls having edges roughly parallel and others corresponding to walls having edges which are not parallel.

Some of the zones may be assembly zones, each of which is designed to be joined with another assembly zone, while other zones may be free zones not used in assembly but connecting assembly zones to each other.

At least some of the assembly zones may correspond to walls having roughly parallel edges.

At least some of the free zones may correspond to walls having roughly parallel edges.

An alveole comprising at least one wall having two edges roughly parallel defining a first plane and at least one wall having two coplanar edges not parallel defining a second plane can be usefully disposed on the surface to be covered in such a way that the angle defined by the first plane with the direction defined by one of the cylinder generators is smaller than the angle defined by the second plane with this same direction.

The structure according to the invention could include one or more strips, possibly roughly helicoidal.

The structure according to the invention may include several strips, each of these shutting itself.

The alveole structure may include alveoles having a form intermediate between that of a truncated prism and that of a truncated pyramid.

The base of this alveole can be roughly hexagonal and possibly constitute a regular hexagon.

One would not be departing from the context of the present invention if the alveolar structure were designed to cover, at least in part, a surface defined by a revolution cylinder.

The alveolar structure according to the invention may include at least one wall belonging to a plane roughly perpendicular to the direction of the generator of the cylinder to be at least partly covered.

The alveolar structure according to the invention may include at least one wall disposed in a plane roughly parallel to the direction of a generator of the cylinder to be at least partly covered.

Therefore and specifically so, the process according to the invention includes assembling, according to a special geometry which will be better understood from the examples which follow, roughly helicoidal strips or a succession of rings, the assembled zones being limited by sides which are sometimes roughly parallel, sometimes not parallel, alternately or not according to the examples cited. The shape of the alveole may be regular or irregular and, according to the shapes selected for the alveoles, the product may be assembled flat and then expanded or be first preformed before assembly so as to provide a product which can be either very easily mouldable or, on the other hand, very rigid, according to the designer's wish.

The present invention also concerns a process for demarcating zones or walls with parallel sides using a curved strip so as to produce an alveolar structure.

According to this process, a roughly longitudinal reference line is defined, then pairs of points are marked on the line in order to demarcate the walls of the alveoles. Each of the two parallel sides defining a wall with parallel sides passes through each of the points of a given pair and is parallel to a transversal straight line with a direction close to the perpendicular straight line or to the reference line or to the straight line joining the two points of the pair.

The transversal straight line may visibly pass close to the point defined, either through the middle of the curved segment defined on the reference line by the pair, or through the middle of the rectilinear segment joining the two points of the pair.

One would not be departing from the context of the present invention by realizing a preshaping of the strip before assembly. In the event of the structure thus obtained being flattenable, it could be compressed in such a way as to facilitate the operation of placing the structure in position, this being effected by simple release of the compression forces.

Again, one would not be departing from the context of the present invention by assembling the curved strip before shaping.

In this case, it will, if required, be possible to compress the structure thus obtained after shaping, the setting up of this structure being effected in the same way as indicated previously.

Of course, the portion of the cylinder to be covered may be covered with the alveolar structure according to the invention, both on its convex side and its concave side.

The present invention will be better understood and its advantages be more apparent from the description which follows of special examples, by no means restrictive, illustrated by the figures annexed and in which:

BRIEF DESCRIPTION OF THE DRAWINGS

FIG. 3 illustrates a helix designed to allow for the realization of the alveolar structure, FIG. 8 illustrates the process according to the invention enabling the limits of certain walls to be marked and FIGS. 9 to 17 show different embodiments of the alveolar cover constructed in accordance with the present invention.

DETAILED DESCRIPTION

Figure 1:
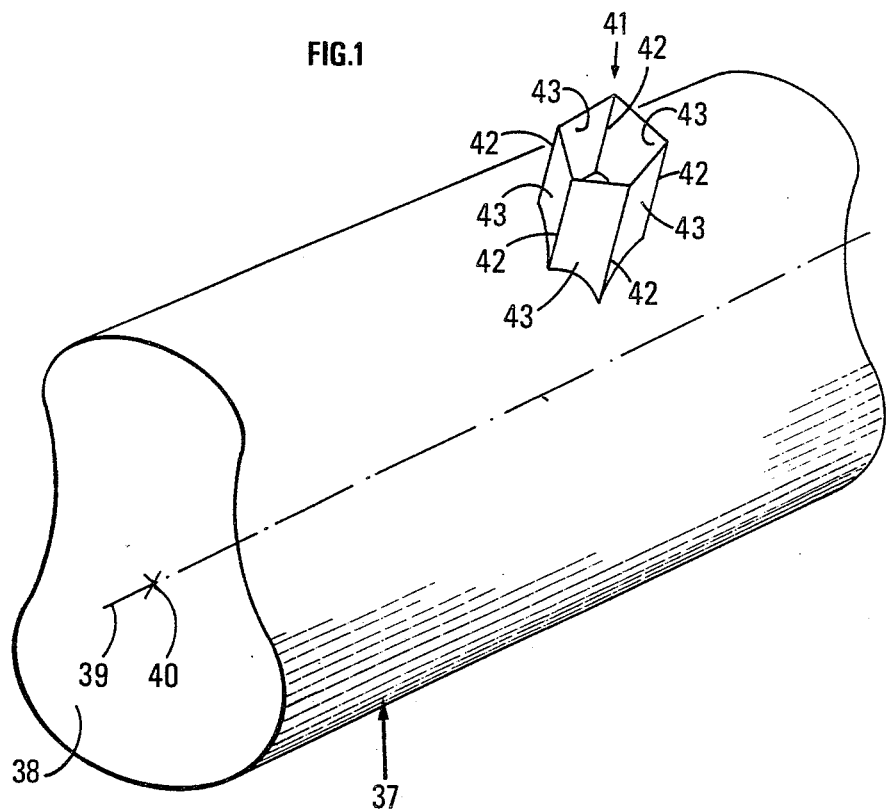
FIG. 1 is a perspective view of a substantially cylindrical member on which an alveole is positioned, FIG. 2 a surface portion of the substantially cylindrical member of FIG. 1.

Referring now to the drawings wherein like reference numerals are used throughout the various views to designate like parts and, more particularly, to FIG. 1, according to this figure, a substantially cylindrical member 37 includes a straight section 38 and an axis 39 defined by a straight line passing through a center of gravity 40 of the straight section 38 parallel to the generating direction of the member 37. An alveole generally designated by the reference numeral 41 is provided on the member 37, with the alveole including edges 42 which demarcate the walls 43.

FIG. 2 represents a part 44 of the surface of the member 37. The reference 45 denotes a wall demarcated by four points A, B, C and D which define four edges 46, 47, 48 and 49.

Each of the edges 46 and 47 has an orthogonal projection EF and GH respectively above zero on a line, respectively 50 and 51, perpendicular to the cylindrical surface 44. The edges 46 and 47 will be termed different from zero radial component edges or, more simply, radial edges.

It should be mentioned that in FIG. 2, the wall 45 does not touch the surface 44. Indeed, this is possible according to the invention, especially in the case where, for example, a wall close to the wall 45 touches the surface 44.

Furthermore, it is quite obvious that the surface 44 to be covered does not need to physically exist since the alveolar structure can have sufficient rigidity to support itself.

Two special examples, by no means restrictive, will enable the present invention to be better understood. In these two examples, the alveolar product is obtained using a curved strip.

FIRST EXAMPLE

Assuming that, using an alveolar product with a longitudinal hexagonal mesh (this term will be explained later), one wishes to cover, as regards a length or height b, an S revolution cylindrical surface defined by a circle 57 of radius R and by a generator direction D perpendicular to the plane P containing the circle 57.

The term longitudinal signifies that the meshes have walls parallel to the generator direction D.

One begins by choosing a reference surface, in this instance a revolution cylinder whose intersection with the plane containing the circle 57 defines a so-called reference curve or circle 58.

One selects the thickness e of the alveolar product and the length size of the mesh m.

Several helicoidal strips are manufactured which, once assembled and shaped, will form the alveolar structure.

Before being shaped, these strips are generally roughly flat. FIG. 3 shows one of these helicoidal strips 60, the line 59 roughly representing the track of the reference surface on the said helicoidal strip 60. The track 59 is not strictly a circle but is almost one.

In the case of regular hexagonal meshes, one looks for the number X corresponding to the number of times that the quantity $Y = m\sqrt{3}$ is contained in the length of the reference curve, i.e. the circle 58. This number X is rounded up to the nearest whole number A.

It is quite obvious that the value of Y is dependent upon the shape of the mesh.

Figure 4:
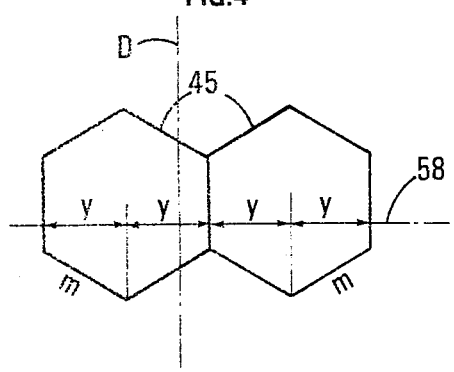
FIG. 4 represents a cutaway view of two hexagonal meshes.

FIG. 4 explains the origin of the value of $m\sqrt{3}$ for a regular hexagonal mesh. In fact, the number A corresponds roughly to the meshes' whole number which the reference circle 58 will contain.

The position of the reference circle 58 may be chosen so that the value of X is equal to A and/or the value m can be modified for the same reason.

Figure 5:
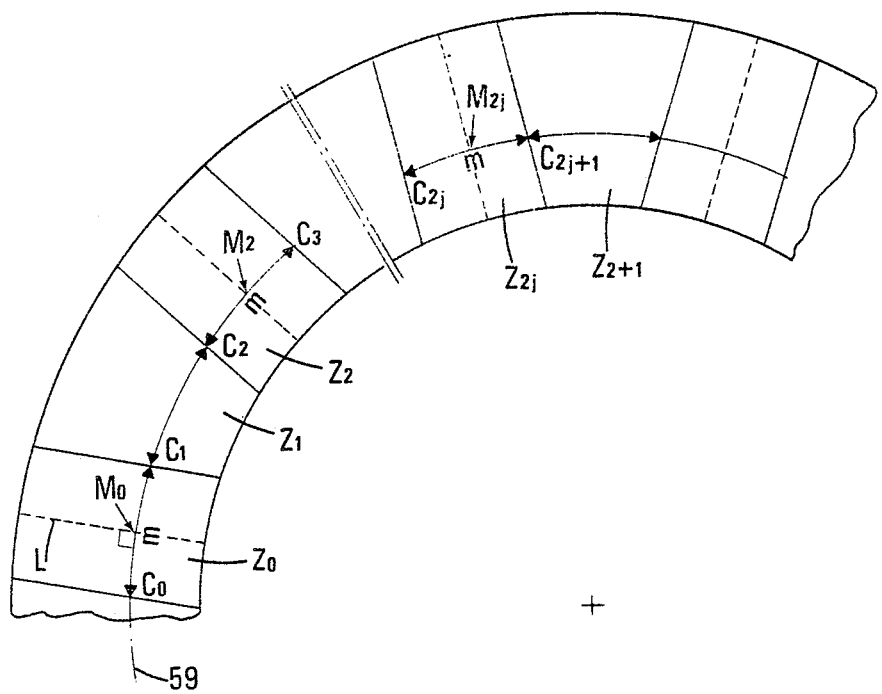
FIG. 5 shows a strip portion used in forming the alveolar covering.

Helices 2A are produced flat, that is, are not folded so as to form various walls of the meshes. The helicies have an internal radius of 8R/3 and an outer radius of 8R/3+e. The helocidal strip 60 has a length equal to 4d/3, with the length being considered on the reference line 59, with d representing a length of the surface to be covered. On the line 59 regularly spaced reference points are designated $C_0, C_1, C_2, \ldots C_{2j}, C_{2j+1}\ldots$, with these points being spaced from a length m (FIG. 5). In a middle $M_0, M_2 \ldots M_{2j}\ldots$ of the pairs of points $C_0, C_1; C_3; \ldots C_{2j}, C_{2j+1}; \ldots$, respectively, a line L is marked out perpendicular to the reference line 59 and, parallel to the line L, two dashes are made to pass through $C_0$ and $C_1$, and one proceeds in the same manner for the points $C_2$ and $C_3$, and so on.

In this way, the zones $Z_0, Z_1 \ldots Z_{2j} \ldots$ are determined with alternate parallel edges $Z_0, Z_2 \ldots Z_{2j} \ldots$ and non-parallel edges $Z_1, Z_3 \ldots Z_{2j+1}$.

The successive zones with parallel edges of an helix could be alternately glued on one side and the other of said helix onto corresponding zones of similar helices. In this way, the helixes are fitted inside each other.

The assembly of helices can be stored flat. By progressively straightening the assembly alongside the generator of the member to be covered, the latter expands and roughly takes the form of the cylinder portion to be covered, as well as the alveolar form provided (in this instance, a hexagonal shape). The first and second helices are then assembled so as to close the alveolar covering.

Figure 6:
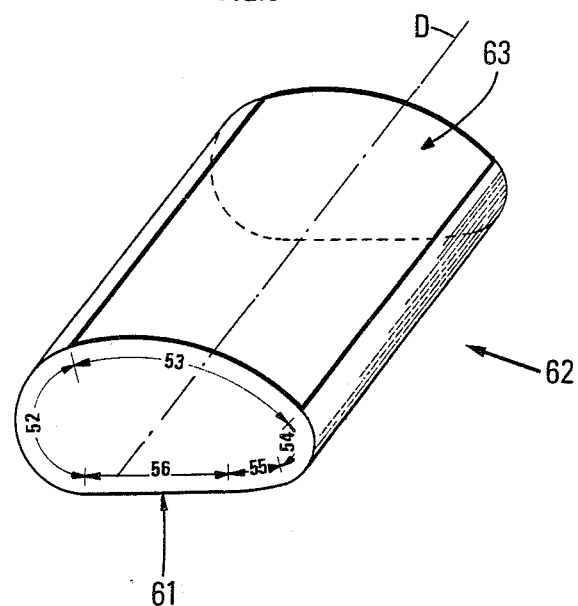
FIG. 6 is a perspective view of a surface to be covered by the alveolar covering, FIG. 7 schematically depicts a ring for forming the covering of the surface of FIG. 6.

In order to cover any cylindrical surface 62 such as the one shown on FIG. 6 which is defined by a straight section limited by a plane curve 61 and a generator direction D, one divides this curve into roughly constant bending radius sectors 52, 53, 54, 55 and 56, the bending radii of each of these sectors being R52, R53, R54, R55 and R56 respectively. One observes that R56 is infinite as sector 56 is defined by a straight segment. Each of these sectors generates a portion or zone of the surface to be covered by a displacement parallel to the generator direction D to the cylinder. Thus, sector 53 generates position 63.

To cover this surface, one proceeds in the same manner for the revolution cylinder previously defined, but using the sets of helices, each of which is used to cover a portion 63 and not the whole member. In this way, multiple non-stackable packets of helices are realized.

By opening the first multihelix packet alongside the generator of the member to be covered, the latter expands and takes the form of the alveolar wasp honeycomb (if the assemblies have been well made). One then proceeds in the same way with the second packet and ascertains that the sides parallel to the generators of the member and of the first and second packet only require a slight displacement in order for both to be adjusted almost exactly. Once this displacement is made, one can then move on to assembling the two bundles.

The procedure is the same for the third and fourth packet and so on, until the last one which is likewise connected to the one before last and to the first.

The surface is then fully covered by a so-called "longitudinal" alveolar product since the zones glued together are roughly parallel to the generator of the cylinder.

SECOND EXAMPLE

Here, it is desired to cover the same substantially cylindrical member as described hereinabove with an alveolar product with a circumferential mesh (in other words, two walls having a given mesh in planes perpendicular to the generator direction).

In this new example, a regular hexagonal mesh is also considered with side m and thickness e.

The homothetic curve 64 of the outer curve demarcating the straight section of the cylinder in the ratio 4/3 is traced and a parallel curve 65 is carried at the distance e to the outside.

These two curves demarcate a surface inside of which it will be possible to find a "reference line" parallel to the inner edge and with a length 4dm or (2d+1)m and being a whole number. If this is not the case, m will be corrected with a very low value so that the length of a reference line L is divisible by 4m or by m(2d+1). It is possible to envisage two cases:

CASE (1) L/4m=d     ring or helix with multiple covering

CASE (2) L/2m=2d+1     single helix

CASE 1: ring

Figure 7:
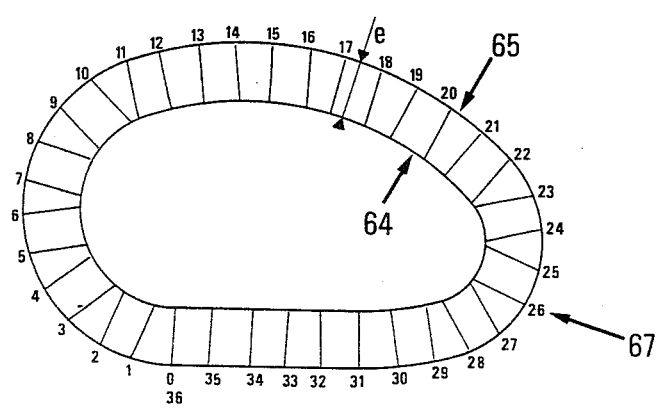
Figure 8:
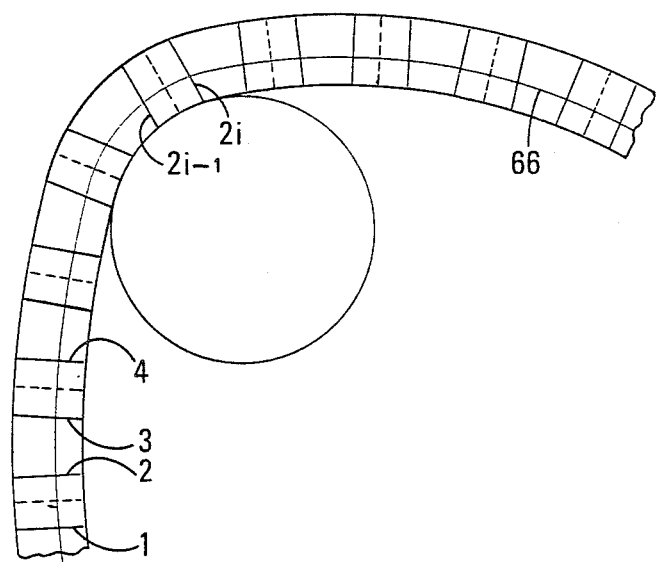

On the reference line 66 (on FIG. 7, the reference line is merged with the outer line 65), points are spaced at regular distances from the length m and designated 1, 2, 3, 4 ... 2i, 2i+1, ... (FIG. 8). In the middle of points 1 and 2, a straight line is drawn passing through the local curve centre and parallel to this straight line, two segments passing through points 1 and 2. One then proceeds likewise for points 3 and 4, 2i−1 and 2i, 2i+1 and 2i+2, etc.

In this way, alternate zones with parallel and non-parallel edges are defined.

Once defined, this ring 67 (FIG. 7) will reproduce as many copies which the length of the generator b of the surface to be covered includes times $m\sqrt{3}/2$.

Zones 2–3, 6–7, 10–11, ... 4d+2–4d+3 ... are glued in the first ring and placed above the next ring which is glued in zones 4–5, 8–9, ... 4d–4d+1 ... and will be placed above the third ring which is glued like the first, then the fourth which is dealt with like the second, and so on until the last one.

Once the assembling is finished, all that is required then is to pull on the extremity rings in the direction of the generator in order that the product expands by taking a shape very much like the homothetic one of the member to be covered.

When the shape of the alveoles at the level of the reference line is regularly hexagonal, the inner shape of the product will be almost that of the member to be covered.

If required, a light machining will enable them to be made identical.

The same design could be used for a helicoidal strip having, in the flat state, the same form as the ring. This will result in only one multithickness assembly zone locally providing a slightly greater radial rigidity on the cylinder.

CASE 2: L/2m=2d+1: ordinary helix

One proceeds as before, the only difference being that one returns to the same starting point at the end of two turns or instead of one.

It should be mentioned that in Example 2, it is not necessary to divide the section to be covered into constant bending radius sectors.

One would not be departing from the context of the present invention in realizing types of meshes other than regular hexagonal ones.

FIGS. 9 to 17 illustrate possible variations according to the present invention. FIGS. 9–17 are evolutes of the aveolar covering, viewed according to a section at the reference surface level. The direction D on FIGS. 9–17 denotes the generator direction of the cylinders.

The reference C denotes the line according to which the cover cylinder has been cut in order to lay out the evoluted surface. Thus, in FIGS. 9-17, the two lines denoted by the reference C touch when the cylinder is restored.

When, close to these two lines denoted by C, two points or walls have the same alphabetical references, the points or walls are adjacent on a given strip portion when the cylinder is restored.

Figure 9:
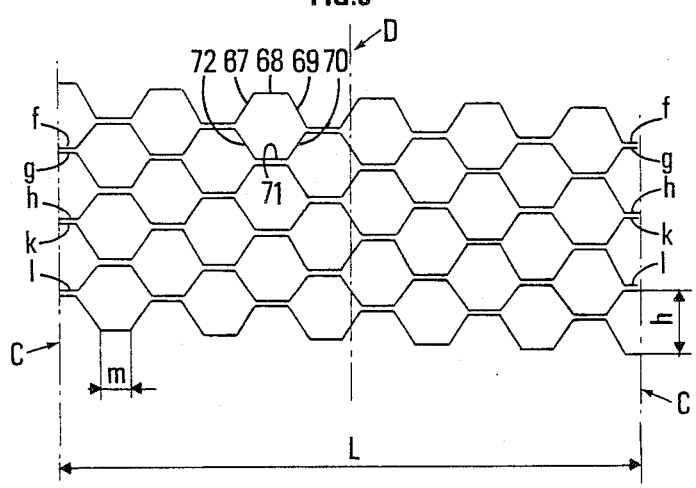

FIG. 9 represents the evolute of an alveolar structure made up of a single helicoidal strip which corresponds to case 2 of the second example. The length of the segments 68 and 71 is equal to m, the lengths of the walls 69 and 72 are both equal to $m_1$ and the walls 67 and 70 both have lengths equal to $m_2 \cdot m_1$ greater than m and $m_2$ which is less than m. The difference between $m_1$ and $m_2$ enables the helicoidal strip to be moved relative to a plane perpendicular to the axis of the cylinder from the height H of a mesh over two revolutions.

Despite this height difference, the cover thus constituted is flattenable since the cumulated length of walls 67, 68 and 69 belonging to a given alveole and situated on the same side of a line joining two gluing zones is equal to the cumulated length of walls 70, 71 and 72 belonging to this same alveole but situated on the other side of the said line. The average length of $m_1$ and $m_2$ may be equal to m. Two succesive helix revolutions have a length which differs slightly from $m_2 - m_1$. However, helices can be constituted with constant diameters, with the the difference being compensated for by a slight modification of the angle of the walls of the alveoles.

FIG. 10 shows an alveolar structure comprising regular hexagons made from a single helicoidal strip, but comprising triple assembly zones.

FIG. 11 represents an alveolar structure with a circumferential mesh comprising several helices 74, 75, 76, 77, 78 and 79 interlaced with each other.

The arrows indicate the walls with parallel sides.

FIG. 12 illustrates the case of single rings 73 whose reference line is homothetic from the curve which generates the surface to be covered. This case has been described in Example 2, case 1.

FIG. 13 illustrates the case of a cover with a longitudinal mesh realized using several helixes 80, 81, 82, 83, 84 and 85.

Figure 14:
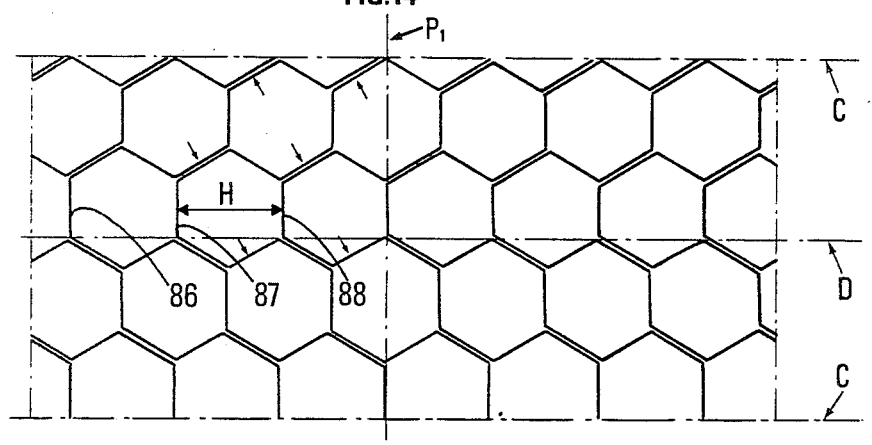

FIG. 14 illustrates the case of a circumferential mesh cover comprising rings 86, 87 and 88 each moving away to a distance equivalent to the mesh height H from a plane P1 perpendicular to the axis of the cylinder passing through a point of this ring 87.

The reference lines of these rings are not homothetic from the line generating the surface to be covered. The arrows denote the walls with parallel sides.

Figure 15:
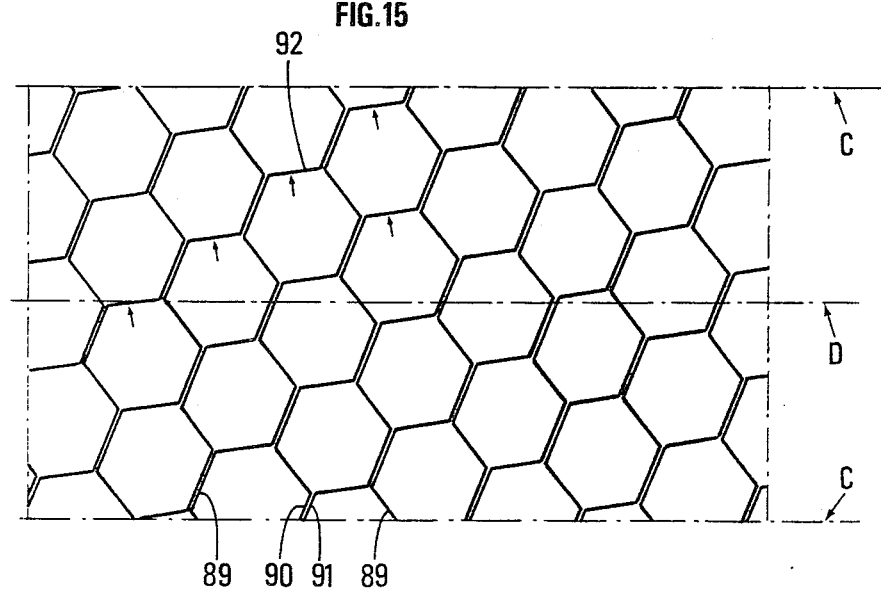

FIG. 15 represents a cover with meshes which are neither circumferential nor radial. The structure comprises several helixes 89, 90 and 91 interlaced with each other. The arrows indicate the walls with parallel sides which generally correspond to walls whose direction of intersection with the reference surface 92 most closely approximates the generator direction D.

Figure 16:
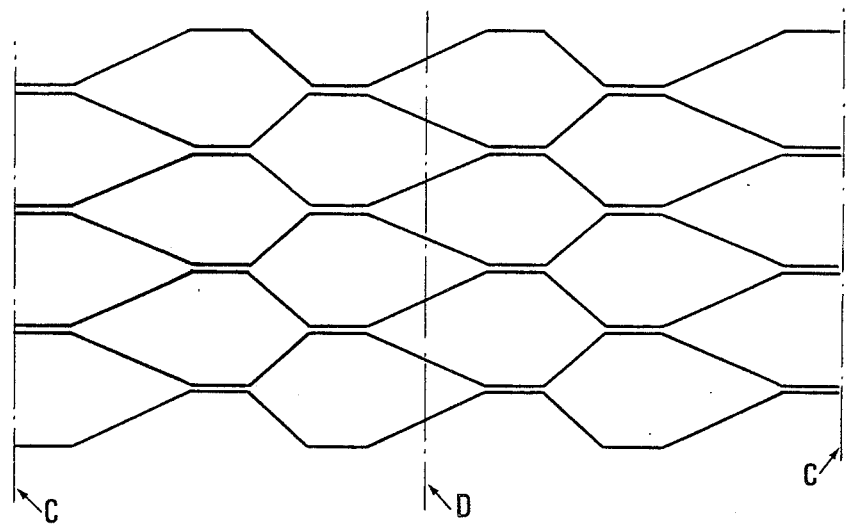
Figure 17:
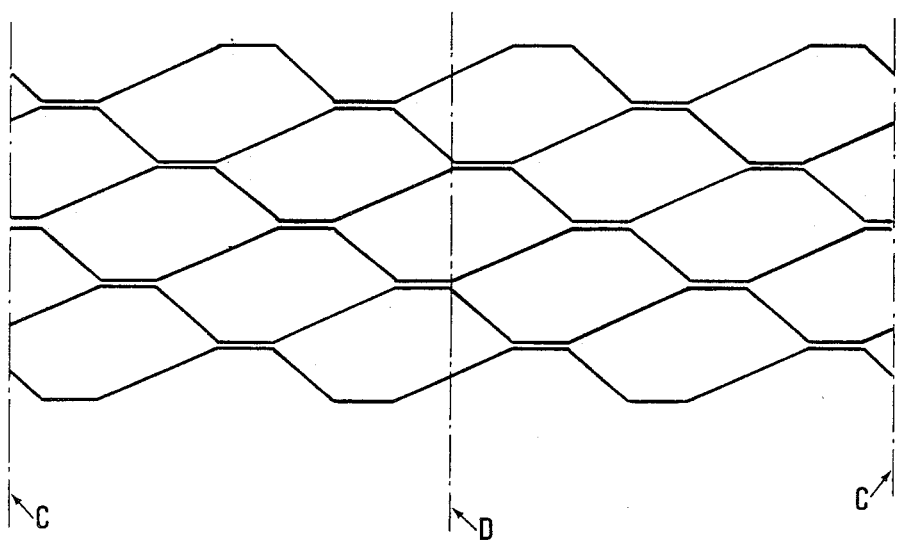

FIGS. 15, 16 and 17 illustrate irregular hexagonal meshes which all likewise remain flattenable.

One would not be departing from the context of the present invention in realizing other shapes of meshes, even if they do not render the cover flattenable.

It is of course possible according to the present invention to cover surfaces other than those of cylinders, for example cones, etc.

One would not be departing from the context of the present invention by providing the inner edges of strips with a shape specially adapted in that, once in position, these edges exactly touch the surface to be covered. The same applies as regards outer edges.

The cover according to the present invention can be used to thermally insulate channels used primarily for carrying hot or cold liquids such as petroleum products (heavy fuels or liquified natural gas).

In order to do this, the alveoles of the cover could be filled with materials having thermal insulation properties and the cover could be covered with at least one sheath.

The thermal insulation material could be a foamed product.

Such a structure, together with channel, cover and alveole, offers a distinct advantage in that it can be subjected to sizeable differential or external pressures without these provoking crushing of the material used for thermal insulation. Indeed, the radial stresses are chiefly borne by the alveolar cover.

Such structures could also be used as light core material in non-planar sandwich structures.

What is claimed is:

1. An alveolar structure for at least partly covering a cylindrical surface, said alveolar structure comprising alveoles demarcated by several walls, characterized in that at least some of the alveoles includes at least one wall having at least two edges parallel to each other and at least one wall comprising at least two edges not parallel to each other, each of the parallel edges and the edges not parallel to each other having an orthogonal length projection different from zero on a line perpendicular to said cylindrical surface passing through said each edge.

2. An alveolar structure according to claim 1, characterized in that the alveolar structure is made up of at least one curved strip.

3. An alveolar structure comprising several alveoles as defined in claim 1, characterized in that said alveolar structure is obtained from at least one curved strip comprising several zones disposed transversally in relation to said strip, some of said zones corresponding to walls having edges parallel and certain other zones corresponding to walls having non-parallel edges.

4. An alveolar structure according to claim 3, characterized in that said some of the zones are assembly zones, each of which is designed to be interlocked with another assembly zone, and in that said certain other zones are termed free zones serving to connect the assembly zones to each other.

5. An alveolar structure according to claim 4, characterized in that at least some of said assembly zones correspond to walls having edges.

6. An alveolar structure according to claim 4, characterized in that at least some of said free zones correspond to walls having parallel edges.

7. An alveolar structure according to claim 1, characterized in that said at least some of the alveoles comprise at least one wall having two parallel edges defining a first plane and at least one wall having two coplanar non-parallel edges defining a second plane, the alveole being disposed in such a way that an angle defined by the first plane, together with a direction defined by one of the generators of the cylindrical surface, is less than an angle defined by the second plane having the same direction.

8. An alveolar structure according to claim 3, characterized in that said strip is roughly helicoidal.

9. An alveolar structure according to claim 3, characterized in that the alveolar structure comprises several roughly helicoidal strips.

10. An alveolar structure according to claim 3, characterized in that the alveolar structure comprises several strips, each of said strips closing itself.

11. An alveolar structure according to claim 1, characterized in that said alveole has a base whose form is roughly hexagonal.

12. An alveolar structure according to claim 1, characterized in that at least one wall belongs to a plane roughly perpendicular to the direction of the generator of said cylindrical surface.

13. A structure according to claim 1, characterized in that at least one wall belongs to a plane roughly parallel to the direction of a generator of the cylindrical surface.

14. An alveolar structure for at least partly covering a cylindrical surface, said alveolar structure comprising alveoles defined by several walls, characterized in that at least some of the alveoles include at least one wall having at least two edges parallel to each other and at least one wall comprising at least two edges not parallel to each other, each of the edges parallel and each of the edges not parallel to each other having an orthogonal length projection different from zero on a line perpendicular to said cylindrical surface passing through said each edge, said edges extending non-radially from said cylindrical surface.

* * * * *